United States Patent [19]
Mitsui

[11] Patent Number: 5,381,832
[45] Date of Patent: Jan. 17, 1995

[54] BRANCHED HOSE CONNECTOR

[75] Inventor: Kenichi Mitsui, Inazawa, Japan

[73] Assignee: Toyoda Gosei Co., Ltd., Nishikasugai, Japan

[21] Appl. No.: 129,401

[22] Filed: Sep. 30, 1993

[30] Foreign Application Priority Data

Oct. 6, 1992 [JP] Japan ................... 4-267144
Oct. 6, 1992 [JP] Japan ................... 4-267146

[51] Int. Cl.6 ............................... F16K 1/02
[52] U.S. Cl. ........................ 137/886; 251/297
[58] Field of Search ............... 285/45, 62, 150; 251/143, 297; 137/886

[56] References Cited

U.S. PATENT DOCUMENTS 3,306,572  2/1967  Dove ................... 251/297
5,033,775  7/1991  Matte et al. .

Primary Examiner—John C. Fox
Attorney, Agent, or Firm—Cushman, Darby & Cushman

[57] ABSTRACT

A branched hose connector includes a branched inner pipe substantially made from a suitable lightweight material, a plurality of hoses connected onto the branched inner pipe, a cover covering the branched inner pipe and a portion of the hoses to join the branched inner pipe and the hoses, and an integrally formed flange projecting outwardly. The branched hose connector is lightweight so that it can be installed with ease via the flange, and it can be manufactured easily and less expensively. Further, the branched hose connector can include a valve member, and a convexity and a concavity provided on opposing end surfaces of the branched inner pipe and the valve member. With these extra features, the valve member can be tightened into the branched inner pipe with a predetermined appropriate torque by a manual operation alone, and it can resist loosening by vibrations, or the like.

7 Claims, 8 Drawing Sheets

BRANCHED HOSE CONNECTOR

BACKGROUND OF THE INVENTION

Priority application nos. 4-267144 and 4-267146, filed in Japan on Oct. 6, 1992, are incorporated hereinto by reference.

FIELD OF THE INVENTION

The present invention relates to a T-shaped or branched hose connector including a flange installing the branched hose connector as desired. Furthermore, it relates to a branched hose connector including a valve which is adapted to purge a fluid.

DESCRIPTION OF RELATED ART

An engine coolant passage of an automobile is provided with a water vent valve in order to purge coolant from the passage. Conventionally, the water vent valve is usually disposed under the radiator. However, when the radiator and the engine are separated by a considerable distance, it is necessary to provide a coolant circulating circuit with an extra water vent valve on the engine side. In addition, branched hoses are widely used because the engine operation has come to be controlled complexly.

A conventional branched hose connector has a branched metallic pipe with metallic secondary pipes extending or branching therefrom which are inserted into and fixed to hoses with clips, or the like. When the conventional branched hose connector is installed in an automobile body, it is preferable to mount the branched hose connector to the automobile body by the metallic branched pipe because the position of each of the secondary pipes can be fixed simultaneously by mounting the branched metallic pipe. For this purpose, a flange is formed so as to project outwardly from the branched metallic pipe to provide a point for mounting.

There are drawbacks associated with the above-described conventional branched hose connector. First, the branched metallic pipe is relatively heavy. Further, it is disadvantageous in view of manufacturing costs because the manhour requirement for manufacturing the branched metallic pipe increases sharply. Furthermore, it cannot be manufactured or installed efficiently because it requires additional clips made of metal, or the like, to fix the hoses to the secondary pipes. Accordingly it increases the number of component parts.

As described above, the hoses are usually fixed to the secondary pipes of the branched metallic pipe with metallic clips or the like. In addition, an associated water vent valve includes a metallic body and a metallic water vent valve. Weight and manufacturing complexity are an issue with these components as well.

Hence, attempts have been made to form the branched metallic pipe as well as the metallic water vent valve from resin or similarly lightweight material in order to satisfy the weight reduction requirement, and in order to integrate them as an assembly and also to integrate them as an assembly to improve assembly efficiency and the configurational accuracy of the assembly. Matte et al. (U.S. Pat. No. 5,033,775) discloses one type of connecting device which is made from resinous materials.

In the conventional branched hose connector, the water vent valve and the body are usually assembled by screwing via threads. A water vent hole is closed by tightening the water vent valve, and it is opened by loosening the water vent valve, thereby allowing the coolant to be purged.

However, even when the water vent valve is tightened, there is a fear that the water vent valve might be loosened by vibrations or the like, resulting in coolant leakage. Accordingly, the water vent valve in the conventional branched hose connector must be firmly tightened. However, if the water vent valve is made from resin, for example, and it is tightened more than necessary, the threads of the water vent valve and the body may be damaged. Thus, the water vent valve must be tightened with a predetermined torque, but no more. However, it is difficult to accurately tighten the water vent valve with such a predetermined torque by a manual operation alone.

SUMMARY OF THE INVENTION

The present invention has been developed to overcome the problems described above.

It is an object of the present invention to provide an improved branched hose connector and parts therefor which can be manufactured and installed with ease, and which is not only lightweight but also less expensive to manufacture and install.

Another object of the present invention to provide a branched hose connector provided with a fluid vent valve for fluid purging or the like, which is made from a lightweight material and which can be tightened with a predetermined torque by a manual operation alone, and which resists loosening when being subjected to vibrations or the like.

These objects and others can be realized by a branched hose according to the present invention. One aspect of the present branched hose connector includes:

- a branched inner pipe having a primary pipe and at least two secondary pipes extending therefrom, each of which are connected to hoses;
- a cover made from a polymer or other suitable, lightweight material, which covers the branched inner pipe and at least the ends of the hoses to connect the secondary pipes of the branched inner pipe and the hoses securely; and
- a mounting flange formed integrally with the branched inner pipe and/or the cover, and projecting outwardly.

In the present branched hose connector, the ends of the hoses are held firmly between the secondary pipes and the cover by the injection pressure exerted during the formation of the cover and the shrinkage force exerted during the cooling thereof, so the hoses are fastened securely to the branched inner pipe the cover. Further, the branched hose connector including the flange is made from resin or the like, with few or no metallic parts, so accordingly the branched hose connector is lightweight as a whole. Additionally, since the branched inner pipe and cover are preferably made of the same plastic material, a feeling of structural integrity and good appearance is provided. Furthermore, the need for awkward fasteners such as clips or the like for fixing the hoses is eliminated in the present branched hose connector. Consequently, the number of component parts and hence man-hours and manufacturing costs are reduced by the present branched hose connector.

As having been described so far, the present branched hose connector is lightweight because it employs no metallic component parts. Further, it can be installed to the installation position with ease because it has no projection such as the clips. Furthermore, it provides a feeling of integrity as well as a good appearance when the branched inner pipe and the cover are made from an identical resinous material. Moreover, it is less expensive and easier to manufacture than the conventional branched hose connector which includes the metallic branched inner pipe and flange. In other words, the present branched hose connector enables to reduce the man-hour requirement for the manufacture and to cut the material costs, and accordingly it enables to remarkably reduce the entire manufacturing cost.

In another aspect of the present branched hose connector, the branched inner pipe is further adapted to purge a fluid and may include feature such as:

- a branched inner pipe including a primary pipe having a main fluid passage therethrough, a plurality of secondary pipes branched from the main fluid passage of the primary pipe, an opening with a female thread at an end of the primary pipe, and a fluid vent hole penetrating through a peripheral wall of the primary pipe;
- a valve, including a shaft with a sealing ring provided at a first end thereof and a male thread provided adjacent to a head formed at a second end of the shaft which has a diameter larger than that of the shaft; and
- at least one concavity and at least one convexity provided on opposing end surfaces of the opening of the inner pipe and the head of the valve, which are engageable with each other.

In the present branched pipe, modified as described above, one or more convexities (e.g., bumps or other types of projections) are provided on an end surface of either the opening of the inner pipe or the head of the valve, or both, and one or more concavities are provided on an opposing end surface of at least the other part. In particular, when a plurality of the convexities are provided at predetermined intervals on both of the opposing end surfaces in a substantially circular pattern, it necessarily creates a plurality of concavities between the convexities. If such is the case, the convexities provided on one of the opposing end surfaces and the concavities provided on the other one of the opposing end surfaces can engage with each other so that the inner pipe and the valve can be engaged with each other.

As the valve is screwed or otherwise tightened into the inner pipe body, a given convexity on one end surface is brought into contact with a corresponding convexity on the opposing end surface. At this moment, a relatively large rotational tightening force is required to continue the tightening process.

Thereafter, when the valve is further tightened into the inner pipe and when the aforementioned convexity is then engaged with a subsequent concavity, the valve and the inner pipe are put into a rotational engagement with appreciable play between the previously mentioned concavity and a subsequent one. Thereafter, when the valve is further tightened into the inner pipe so that the convexities again oppose one another, a larger tightening force is again required. As a result, an operator who is tightening the valve into the inner pipe can readily determine the difference between when the convexity is engaged with the concavity and when the convexity is disengaged from the concavity and the tactile difference therebetween.

Hence, it is possible to tighten the valve securely but prevent it from being tightened excessively by designing the present branched hose connector as follows. Namely, the operator tightens the valve into the inner pipe until he acquires a tactile feeling that the tightening is properly established such that the convexities and the concavities are engaged with each other, at which time the sealing ring is pressed onto the inner surface of the inner pipe.

Further, it is necessary to exert a comparatively large force in order to loosen or disengage the convexities and concavities from their engagement. The larger force is substantially equal to the aforementioned force required when the concavities and convexities are first moved into engagement during tightening. Consequently, it is possible to prevent the valve and the cylindrical from being loosened by vibrations, or the like.

When the branched inner pipe is modified as described above, the valve can be tightened with a predetermined appropriate torque by manual operation alone. As a result, coolant leakage can be prevented. Also, the screw threads of the valve and the inner pipe can be protected from damage. Further, the valve can be prevented from loosening even when it is subjected to vibrations, or the like. Thus, coolant leakage can be assuredly avoided.

In addition, the whole present branched hose connector including the branched inner pipe modified as described above can be made from resin (or another lightweight material). Accordingly, this reduces material costs and, in turn, overall manufacturing costs. Thus, the present branched hose connector is not only lightweight but also less expensive.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having a generally described the present invention, a further understanding can be obtained by reference to the specific preferred embodiments which are provided herein for purposes of illustration only and are not intended to limit the scope of the appended claims.

First Preferred Embodiment

Figure 1:
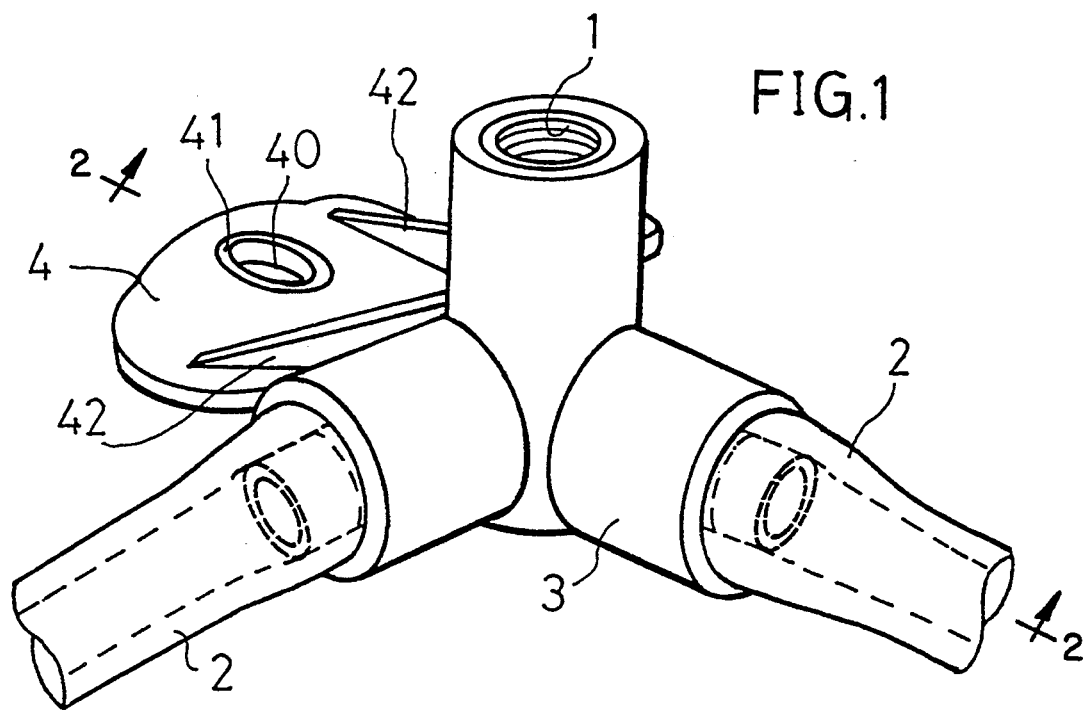
FIG. 1 is a perspective view of a first embodiment of the branched hose connector according to the present invention.
Figure 2:
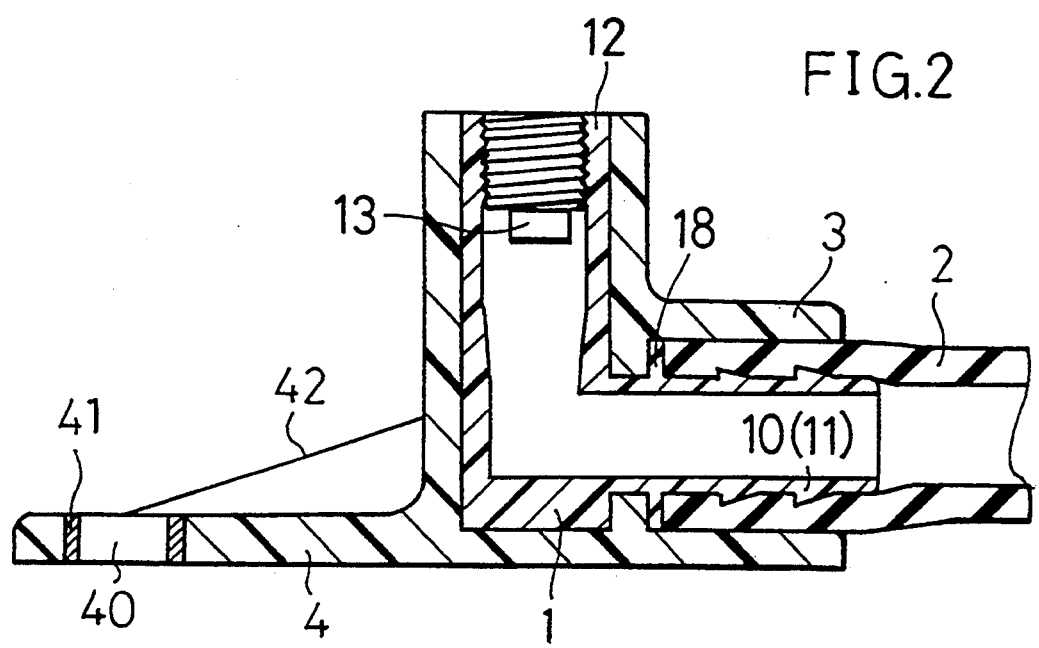
FIG. 2 is a cross-sectional view taken along line 2—2 of FIG. 1.

FIGS. 1 and 2 illustrate a first preferred embodiment of the branched hose connector according to the present invention. The branched hose connector includes a branched inner pipe 1 which may be made from glass fiber reinforced nylon (preferably having glass fiber in an amount of about 30% by weight) a cover 3 which may also be made from fiber reinforced nylon which covers the branched inner pipe 1, and a flange 4 made from the same material as the cover 3, in this case fiber reinforced nylon. The branched inner pipe 1 and the cover 3 having flange 4 may also be made from other polyamide resins, polypropylene resins, or POM resins such as polyacetal resins. Glass fiber may be added to the material(s) selected for structural reinforcement. Glass fiber between about 0% to about 45% by weight is preferably added when making cover 3, while about 15% to about 45% by weight is added when making the flange 4. Hoses 2, 2, typically made from rubber, are connected to branch or secondary pipes 10 and 11.

Figure 3:
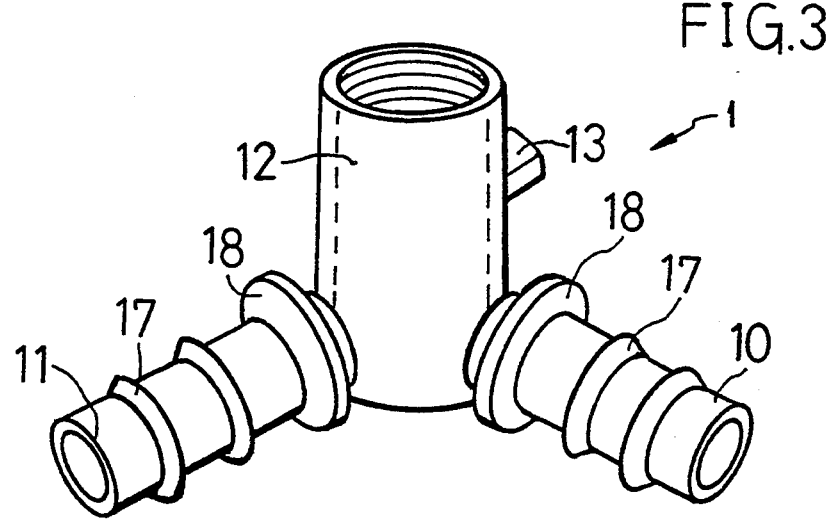
FIG. 3 is a perspective view of the branched inner pipe included in the first embodiment of the present invention.

As illustrated in FIG. 3, the branched inner pipe 1 includes a pair of secondary pipes 10, 11 which are inserted into hoses 2, 2, and a water vent cylinder or primary pipe 12 communicating with the branch or secondary pipes 10, 11. The secondary pipes 10, 11 each have at least one sawtooth-shaped annular projections 17 on their outer peripheral surface. Secondary pipes 10, 11 are also each provided with a collar 18 adjacent to the primary pipe 12. The sawtooth-shaped annular projections 17 help prevent the hoses 2, 2 from slipping off pipes 10, 11. The collars 18, 18 aid in positioning hoses 2, 2 and act as end-stops when pipes 10, 11 are inserted into the hoses 2,2.

The primary pipe 12 is provided with a fluid outlet port 13 which penetrates through the peripheral wall of primary pipe 12. Pipe 12 is also provided with a female screw thread 15 on its inner peripheral surface down to the outlet port 13 and by which it is engaged with a valve (not shown) provided with a male thread. The sealing between the primary pipe 12 and the valve is relieved by rotably loosening the valve, thereby discharging fluid flowing in the branched inner pipe 1 through the fluid outlet port 13. Primary pipe 12 may also have a tapered inner surface portion 16 which decreases in diameter from top to bottom for use with a valve member as described in the second embodiment below.

Figure 4:
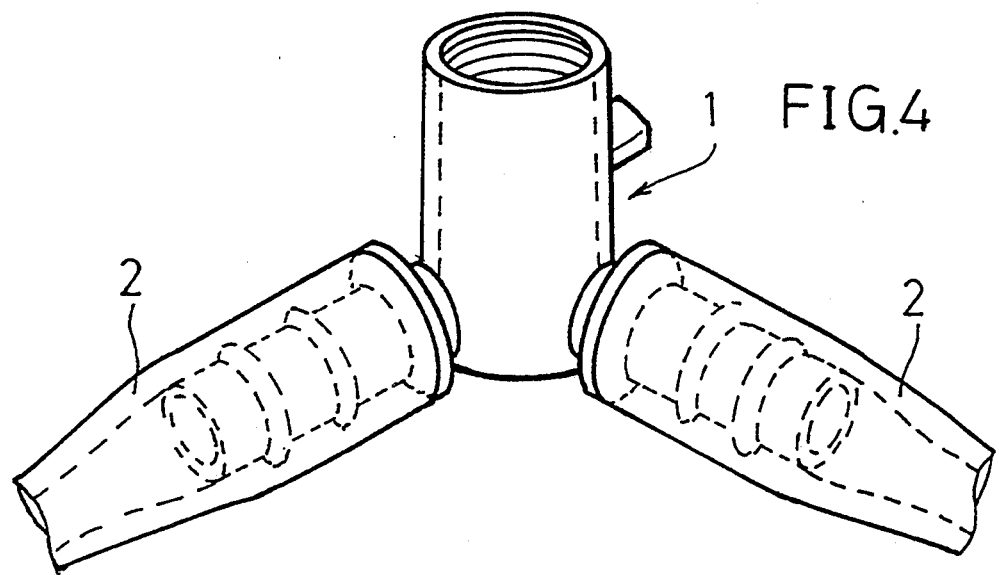
FIG. 4 is a perspective view of the branched inner pipe whose secondary pipes are inserted into hoses in a process of manufacture of the first embodiment.

The hoses 2, 2 may be adapted to operate as radiator hoses, for example. Hoses 2,2 are connected to the branched inner pipe 1 as illustrated in FIG. 4.

As shown in FIG. 2, the cover 3 covers the ends of the hoses 2, 2 connected to secondary pipes 10, 11 (compare FIG. 4 and FIG. 1) and also the outer peripheral surface of the primary pipe 12. Further, a flange 4 is formed integrally with the cover 3, and it extends in a direction opposite to the direction in which the secondary pipe 10 extends. The cover 3 may be formed of nylon reinforced with glass fibers by an injection molding process. The hoses 2, 2 are held firmly between the secondary pipes 10, 11 and the cover 3 by the injection pressure exerted during the forming of the cover 3 (described below) and also a shrinkage force exerted during the cooling thereof. Consequently, they are fastened securely to the secondary pipes 10, 11 by the cover 3.

It is preferable to make cover 3 from a polymer or other lightweight material which an elastic modulus of about 5,000 kgf/cm$^2$ or more. In a case where the cover is made from a polymer or other material which has an elastic modulus of less than about 5,000 kgf/cm$^2$, the cover and the flange have insufficient strength and therefore cannot operate reliably as intended. By way of illustration, cover 3 has an elastic modulus of 40,000 kgf/cm$^2$ at 80° C. with water absorbed in an amount of 1.5%. Accordingly, it exhibits sufficient strength for this application.

The flange 4 is formed in a generally, flattened plate-like shape, and it is provided with a bolt hole 40 into which a mounting bolt can be inserted. Further, the flange 4 may be provided with a metallic ring 41 which is integrally disposed about the bolt hole 40 by an insert molding process. The metallic ring 41 provides structural reinforcement for the bolt hole 40. The flange 4 is also provided with structural reinforcing members, such as a pair of ribs 42, 42 which are formed so as to reinforce the flange 4 itself and which extend from the portion of cover 3 which covers primary pipe 12 of the branched inner pipe 1.

The branched hose connector is manufactured in the following manner. First, the branched inner pipe 1 is formed by an injection molding process, as illustrated in FIG. 3. Then, as illustrated in FIG. 4, the secondary pipes 10, 11 are inserted into the hoses 2, 2 until they are brought into contact with the collars 18, 18 of branched pipes 10, 11.

Secondly, the branched inner pipe 1 with the hoses 2, 2 attached to secondary pipes 10, 11 is placed in a cavity of a dividable mold. The metallic ring 41 is also placed at a predetermined position in the mold cavity. The cover 3 and the flange 4 are then integrally formed by an injection molding process using a resin. The molten resin charged into the cavity is cooled and solidified which compresses the ends of the hoses 2, 2 about secondary pipes 10, 11. Thus, the hoses 2, 2 are firmly fixed about the outer peripheral surfaces of the secondary pipes 10, 11 by the injection pressure of the resin and also by the shrinkage force of the cooling resin.

According to the first preferred embodiment of the present invention, the hoses 2, 2 are held firmly between the cover 3 and the secondary pipes 10, 11. Consequently, the present branched hose connector eliminates the clips which are required to fasten the hoses in conventional branched hose connectors. The present branched hose connector can be installed in an automobile body by fixing the flange 4 to an installation position with a bolt. The installation can be carried out with ease because the hose connector is lightweight. This advantage arises from the fact that almost all of the present branched hose is made from resin, coupled with rubber hoses 2,2. The present branched hose connector is very easy to manufacture because the flange 4 can be formed simultaneously with the formation of the cover 3.

Figure 9:
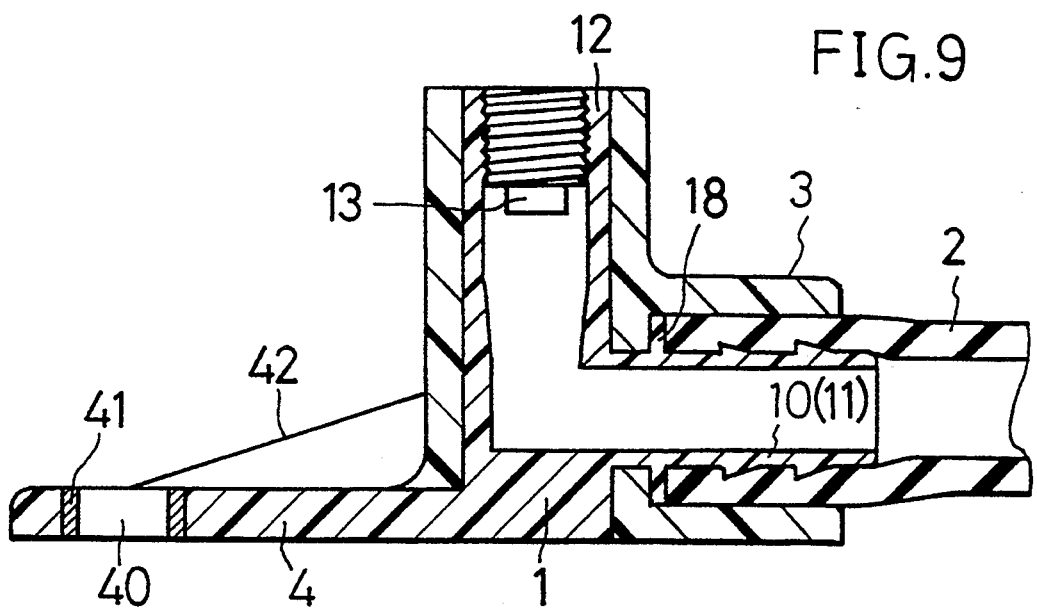
FIG. 9 is a cross-sectional view of a modified version of the first embodiment of the present invention.

The branched hose connector is not limited to the configuration described above. For instance, as illustrated in FIG. 9, the flange 4 can be formed integrally with the branched inner pipe 1 instead of with the cover 3. In addition, the method of fastening the hoses 2, 2 carried out in the first preferred embodiment can be also applied to fastening the ends of the hoses in the configuration shown in FIG. 9.

When the branched inner pipe 1 is provided with the flange, however, it is necessary to provide a seal between the branched inner pipe 1 and the mold during the formation of the cover 3. Accordingly, the construction of the mold is liable to be complicated. Therefore, it is much preferable to form the flange with the cover so as to project outwardly therefrom.

Second Embodiment

FIGS. 5 through 8 illustrate a second preferred embodiment of the branched hose connector according to the present invention. As can be seen from FIGS. 5 through 8, the branched hose connector has the same construction as that of the first embodiment except that it further includes a modified branched inner pipe 1 and a valve 5. Corresponding component parts are designated with identical reference numerals as in the first embodiment are not re-described in detail hereinafter.

In the second embodiment of the present invention, the hoses 2, 2 in connection with secondary pipes 10, 11 may, for example, operate as a bypass hose.

Figure 7:
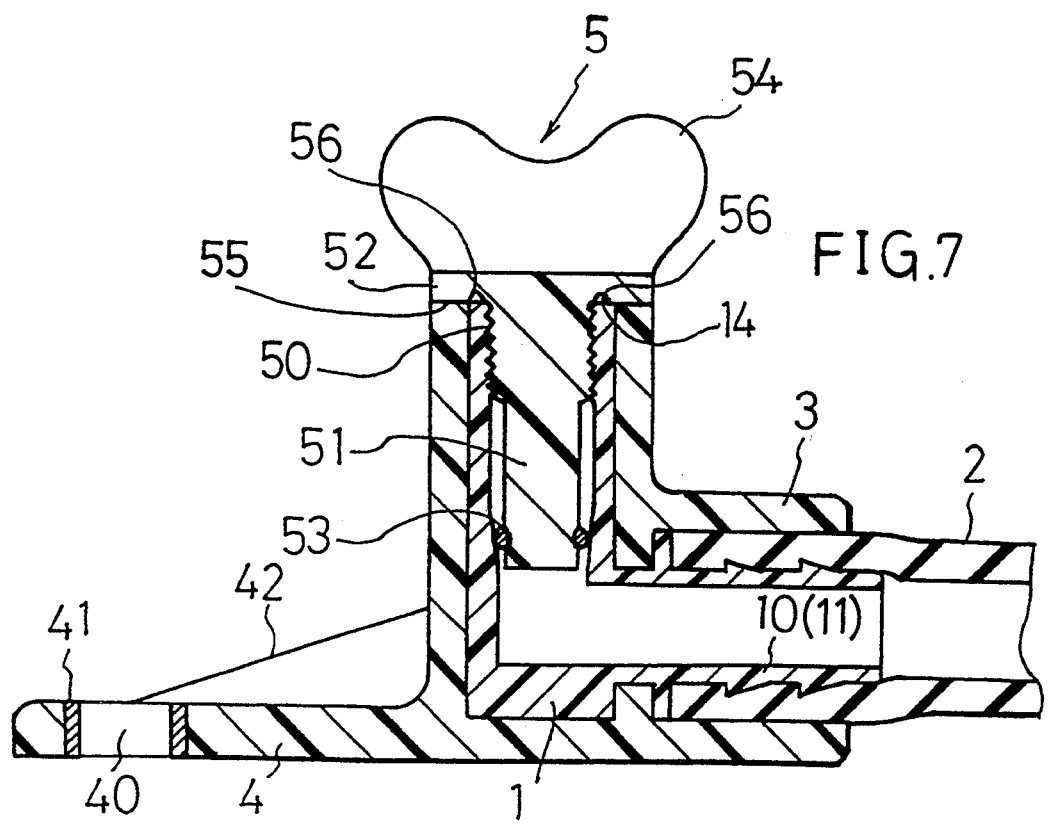
FIG. 7 is a cross-sectional view of the second embodiment after screwing the valve into the main fluid passage of the primary pipe.
Figure 8:
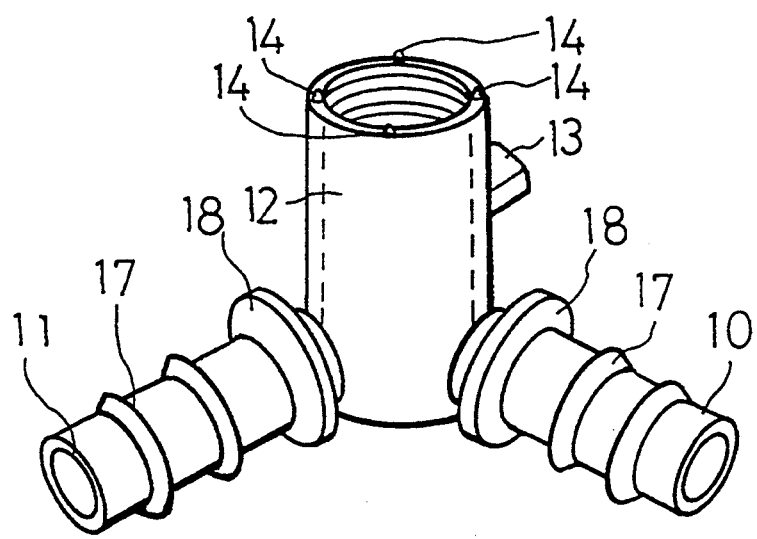
FIG. 8 is a perspective view of the branched inner pipe of the second embodiment of the present invention.

As illustrated in FIGS. 5–8 the primary pipe 12 of the branched inner pipe 1 is provided with, in this instance, four projections 14 on its top end surface. The valve 5 has male threads 50 which cooperate with female threads 16 on the primary pipe 12 and is screwed or tightened into the primary pipe 12 as illustrated in FIG. 7.

Figure 5:
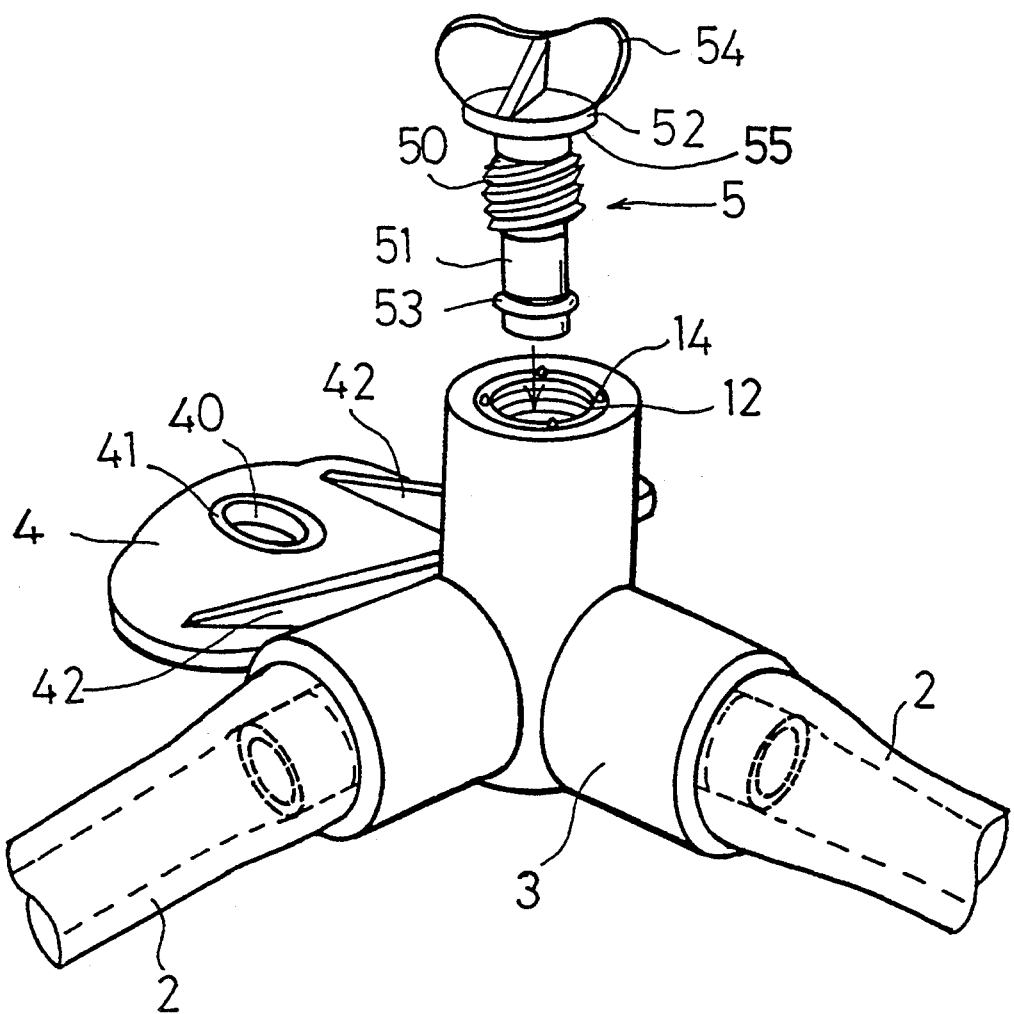
FIG. 5 is a perspective view of a second embodiment according to the present invention.
Figure 6:
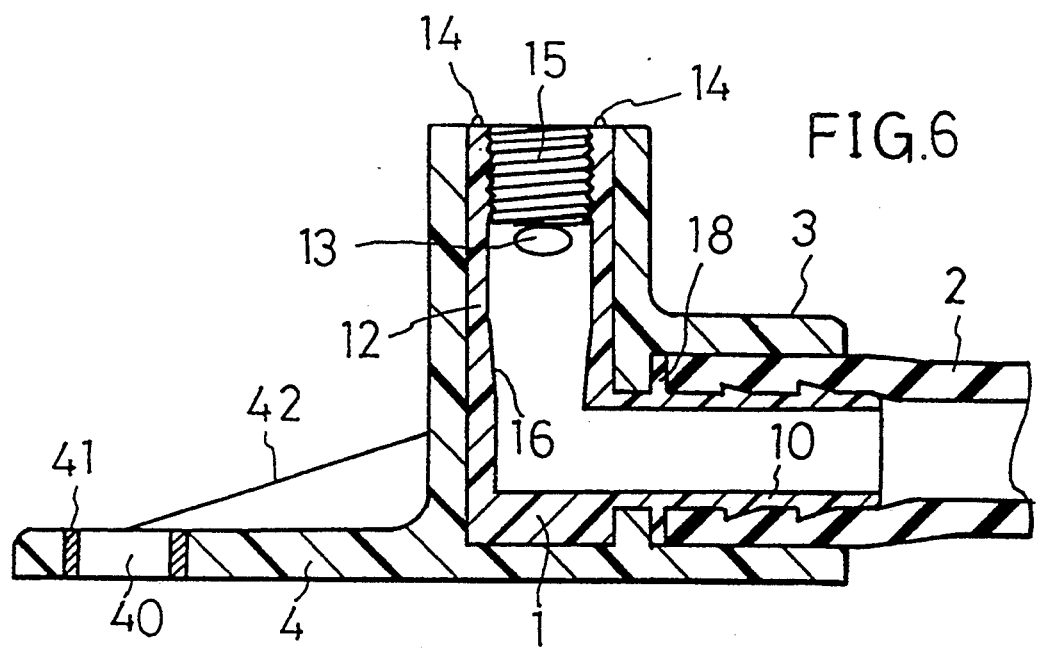
FIG. 6 is a partial cross-sectional view of the second embodiment before screwing a valve into a primary pipe of a branched inner pipe.

As illustrated in FIGS. 5 and 7, the valve 5 includes a shaft 51 carrying the male threads 50, a head 52 having a larger diameter than the shaft 51, formed at one end thereof. A sealing ring 53 made of rubber or other resilient material is disposed at or adjacent to other end of the shaft 51. Further, the head 52 is provided with a knob 54, which is formed to be easily held by the fingers of an operator. It is also provided with four depressions 56 which are engageable with the four projections 14 of the branched inner pipe 1, as illustrated in FIG. 7.

The second embodiment of the present invention is manufactured in the same manner as the first preferred embodiment. The valve 5 is independently formed by injection molding process. The valve 5 is preferably made from a material without glass fiber mixed therein.

In the second embodiment of the present branched hose connector, the valve 5 is screwed or tightened into the primary pipe 12 of the branched inner pipe 1. In the process of tightening, the bottom surface 55 of the head 52, having depressions 56 therein, is brought into contact with the tops of the projections 14 of the primary pipe 12. When the valve 5 is further tightened and when the top ends of the projections 14 of the primary pipe 12 are in contact with the bottom surface 55 of the valve 5, a larger tightening force is required.

On the other hand, when the valve 5 is further tightened and when the projections 14 of the primary pipe 12 are engaged with the depressions 56 of the valve 5, the valve 5 and the primary pipe 12 have an engagement with appreciable play, which can be loosened to a certain extent. Thereafter, when the valve 5 is further tightened to thereby disengage the projections 14 and the depressions 56, a larger force is again required. As a result, an operator who tightens the valve 5 into the primary pipe 12 can clearly tell the difference between when the depressions 56 are engaged with the projections 14 and when the depressions 56 are disengaged from the projections 14.

As the valve 5 is tightened into the primary pipe 12 of the branched inner pipe 1, the sealing ring 53 is advanced more deeply into the primary pipe 12 and is gradually compressed by the tapered surface 16 to establish sealing. The outlet port 13 is thereby sealed from the secondary pipes 10, 11 by pressing the sealing ring 53 onto the tapered surface 16, thus preventing a fluid such as a coolant from leaking through to the outlet port 13. Further, a relatively large force is also required to loosen or disengage the depressions 56 and the projections 14 from their engagement which is substantially equal to the larger force required when the portion of the bottom surface 55 free from the depressions 56 is moved to get over the projections 14 of the primary pipe 12. Consequently, it is possible to prevent the valve 5 from being loosened by vibrations or the like.

Figure 10:
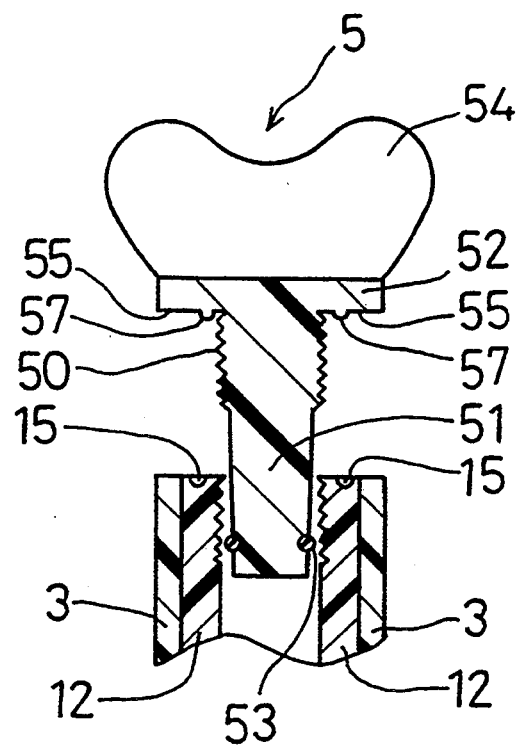
FIG. 10 is a partial cross-sectional view of a modified version of the second embodiment.

The branched hose connector is not limited to the construction described in the second embodiment. For instance, the projections and depressions may be interchanged in placement as illustrated in FIG. 10, wherein the primary pipe 12 is provided with projections 57. With such a modified construction, the branched hose connector operates and provides advantages similar to those of the second preferred embodiment as described above.

Figure 11A:
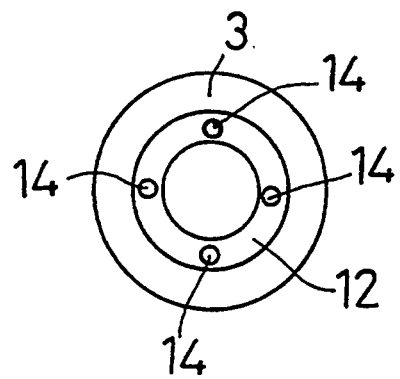
FIG. 11(a) is a top view of a primary pipe in a further modified version of the second embodiment of the present invention.
Figure 11B:
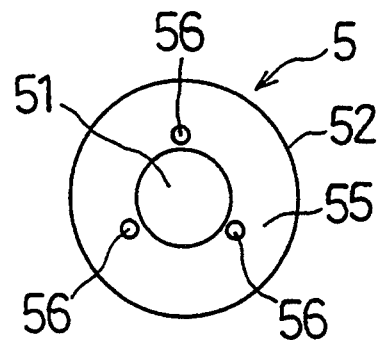
FIG. 11(b) is a bottom view of a valve in a further modified version of the second embodiment of the present invention.

Further, the number of the projections and the depressions are certainly not limited to four. For instance, as few as one projection 14 (57) and one depression 56 can be provided, or, as illustrated in FIGS. 11(a) and 11(b), a different number of each may be provided.

Figure 12:
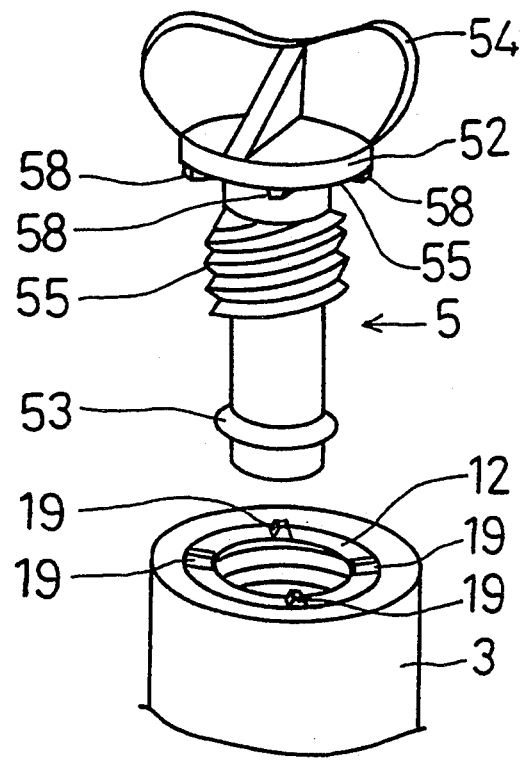
FIG. 12 is a partial perspective view of a still further modified version of the second embodiment.

Furthermore, as illustrated in FIG. 12, both the valve 5 and the primary pipe 12 of the branched inner pipe 1 can be provided with a plurality of interfering projections 58 and 19 disposed at predetermined intervals on both of the opposing end surfaces concentrically. Accordingly, the spaces between the projections 58 and 19 can be regarded as a plurality of depressions. The projections 58 of the valve 5 are adapted to get over the projections 19 of the primary pipe 12 during the screwing or tightening of the valve 5 into the primary pipe 12, or vice versa. With the construction, it is again possible to determine manually by feel the tightening state of the valve 5.

Figure 13:
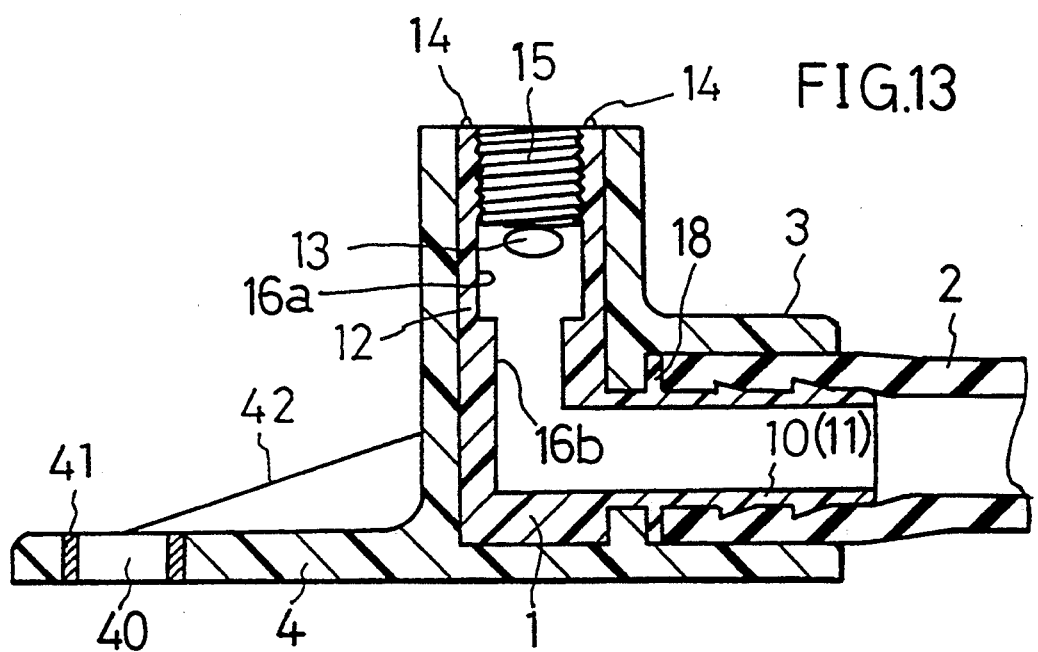
FIG. 13 is a cross-sectional view of another modified version of the second embodiment.

Moreover, in the second embodiment of the present invention, the primary pipe 12 of the branched inner pipe 1 is provided with the tapered inner surface 16, such that sealing ring 53 is pressed onto the tapered surface 16 to establish sealing. The branched hose connector is not limited to this construction. For instance, as illustrated in FIG. 13, the central fluid passage of the primary pipe 12 can be formed with an intermediate, non-continuous change in diameter, namely, a large diameter passage 16a and a smaller diameter passage 16b. When such is the case, sealing can be established when the sealing ring 53 is located at the smaller diameter passage 16b and pressed onto the non-continuous shoulder, and the sealing can be relieved when the sealing ring 53 is retracted to the larger diameter passage 16a.

Having now fully described the present invention, it will be apparent to one of ordinary skill in the art that many changes and modifications can be made thereto without departing from the spirit or scope of the present invention as set forth herein including the appended claims.

What is claimed is:

1. A branched hose connector including a plurality of hoses, comprising:
   a branched inner pipe which includes:
      a primary pipe having a fluid outlet port and an open end which is provided with a screw thread;
      a plurality of secondary pipes extending from and in fluid communication with said primary pipe, said hoses having respective ends connected onto said secondary pipes;
   a cover covering at least a portion of said branched inner pipe and said ends of said hoses; and
   a valve member having a shaft with a sealing ring at a first end thereof, and a screw thread and a valve head formed at a second end thereof, said valve head having a diameter greater than said shaft, said valve head having an end surface which faces opposite said open end of said primary pipe, said screw threads of said primary pipe and said valve member being rotatably engageable;
   wherein at least one of said open end of said primary pipe and said end surface of said valve head has at least one convexity and the at least the other of said open end of said primary pipe and said end surface of said valve head has at least one concavity; said at least one convexity and said at least one concavity being engageable with one another as said valve member and said primary pipe are rotated with respect to one another.

2. A branched hose connector according to claim 1, wherein said end surface of said valve head has said at least one convexity and said open end of said primary pipe has said at least one concavity.

3. A branched hose connector according to claim 1, wherein said end surface of said valve head has said at least one concavity and said open end of said primary pipe has said at least one convexity.

4. A branched hose connector according to claim 1, wherein a different number of concavities and convexities, respectively, are provided.

5. A branched hose connector according to claim 1, wherein both said end surface of said valve head and said open end of said primary pipe have a plurality of spaced apart convexities thereon to effectively form a plurality of concavities between said convexities.

6. A branched hose connector according to claim 1, wherein an interior diameter of said primary pipe smoothly decreases in a direction from said open end thereof towards said secondary pipes for cooperating with said sealing ring of said valve member to close off fluid communication between said secondary pipes and said fluid outlet port in said primary pipe.

7. A branched hose connector according to claim 1, wherein an interior diameter of said primary pipe decreases by at least one stepped decrease in diameter in a direction from said open end thereof towards said secondary pipes for cooperating with said sealing ring of said valve member to close off fluid communication between said secondary pipes and said fluid outlet port in said primary pipe.

* * * * *